US009403928B2

(12) United States Patent
Berbee et al.

(10) Patent No.: US 9,403,928 B2
(45) Date of Patent: Aug. 2, 2016

(54) POLYMERIZATION PROCESS TO MAKE LOW DENSITY POLYETHYLENE

(71) Applicant: Dow Global Technologies LLC, Midland, MI (US)

(72) Inventors: Otto J. Berbee, Hulst (NL); Cornelis Den Doelder, Terneuzen (NL); Egbert Nijhof, Westdorpe (NL); Mehmet Demirors, Pearland, TX (US); Sjoerd A. De Vries, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/262,981

(22) Filed: Apr. 28, 2014

(65) Prior Publication Data

US 2014/0303309 A1     Oct. 9, 2014

Related U.S. Application Data

(60) Division of application No. 13/515,028, filed as application No. PCT/US2010/060244 on Dec. 14, 2010, now Pat. No. 8,729,186, which is a continuation-in-part of application No. 12/641,985, filed on Dec. 18, 2009, now abandoned.

(51) Int. Cl.
| | |
|---|---|
| *C08F 220/06* | (2006.01) |
| *C08F 10/02* | (2006.01) |
| *C08F 110/02* | (2006.01) |
| *C08F 210/02* | (2006.01) |
| *C08F 218/08* | (2006.01) |
| *C08F 220/18* | (2006.01) |
| *C08L 23/06* | (2006.01) |
| *C09D 123/06* | (2006.01) |
| *C08F 210/16* | (2006.01) |

(52) U.S. Cl.
CPC .............. *C08F 220/06* (2013.01); *C08F 10/02* (2013.01); *C08F 110/02* (2013.01); *C08F 210/02* (2013.01); *C08F 218/08* (2013.01); *C08F 220/18* (2013.01); *C08L 23/06* (2013.01); *C09D 123/06* (2013.01); *C08F 210/16* (2013.01); *C08L 2207/066* (2013.01)

(58) Field of Classification Search
CPC ...... C08F 10/02; C08F 110/02; C08F 210/02; C08F 218/08; C08F 220/06; C08F 222/18; C08F 210/16; C08F 2500/08; C08F 2500/09; C08F 2500/12; C08F 2500/26; C09D 123/06; C08L 23/06; C08L 2207/066
USPC ........ 524/528; 525/240; 526/318.6, 329, 331, 526/352.2
See application file for complete search history.

(56) References Cited

U.S. PATENT DOCUMENTS

| | | | |
|---|---|---|---|
| 3,485,706 A | 12/1969 | Evans | |
| 3,913,698 A | 10/1975 | Gogins | |
| 4,322,027 A | 3/1982 | Reba | |
| 4,340,563 A | 7/1982 | Appel et al. | |
| 4,413,110 A | 11/1983 | Kavesh et al. | |
| 4,663,220 A | 5/1987 | Wisneski et al. | |
| 4,668,566 A | 5/1987 | Braun | |
| 4,894,397 A | 1/1990 | Morgan et al. | |
| 4,999,221 A | 3/1991 | Eigenbrod et al. | |
| 5,874,513 A * | 2/1999 | Watanabe et al. | ......... 526/348.1 |
| 6,407,191 B1 | 6/2002 | Mezquita et al. | |
| 6,545,094 B2 * | 4/2003 | Oswald | ............... C08L 23/0815 525/191 |
| 7,838,611 B2 | 11/2010 | Yamada et al. | |
| 8,415,442 B2 | 4/2013 | Karjala et al. | |
| 2004/0158016 A1 | 8/2004 | Lee et al. | |
| 2009/0137755 A1 | 5/2009 | Yamada et al. | |
| 2009/0306299 A1 * | 12/2009 | Kipke et al. | .................. 525/240 |
| 2012/0065352 A1 | 3/2012 | Nozue et al. | |

FOREIGN PATENT DOCUMENTS

WO     2005021622     3/2005

OTHER PUBLICATIONS

S. Goto et al.; Jornal of Applied Polymer Science; Applied Polymer Symposium; 36, 21-40, 1981.
M. Anderson, B. Wittgren, K-G Wahlund, Anal. Chem. 75, 4279 (2003).
G. Mortimer; Journal of Polymer Science; Part A-1; chain transfer in ethylene polymerization; vol. 4, p. 881-900 (1966).
G. Mortimer; Journal of Polymer Science; Part A-1; Cahin transfer in ethylene polymerization; Part Iv. Additional study at 1360 atm and 130° C.; vol. 8, p. 1513-1523 (1970).
G. Mortimer; Journal of Polymer Science; Part A-1; Chain transfer in ethylene polymerization, Part VII; very reactive and depletable transfer agents; vol. 10, p. 163-168 (1972).

* cited by examiner

*Primary Examiner* — Nathan M Nutter
(74) *Attorney, Agent, or Firm* — Whyte Hirschboeck Dudek S.C.

(57) ABSTRACT

A high pressure polymerization process to form an ethylene-based polymer comprises the steps of:
  A. Injecting a first feed comprising ethylene and optionally a chain transfer agent system (CTA system) into a first autoclave reactor zone operating at polymerization conditions to produce a first zone reaction product, the CTA system of the first reactor zone having a transfer activity Z1; and
  B. (1) Transferring at least part of the first zone reaction product to a second reactor zone selected from a second autoclave reactor zone or a tubular reactor zone and operating at polymerization conditions, and, optionally, (2) freshly injecting a second feed into the second reactor zone to produce a second zone reaction product, with the proviso that the second reactor zone contains a CTA system having a transfer activity Z2; and
with the proviso that the ratio of Z1/Z2 is less than 1.

7 Claims, 4 Drawing Sheets

Log Melt Elasticity (ME) versus Log Melt Index (MI) for
Comparative Example 1 and Example 2

Gloss and Haze for Example 2c and Comparative Example 1b

Drawdown (Meters Per Minute (mpm) and Neck-In (mm)
for Example 2c and Comparative Example 1b Gloss and Haze for Example 4 and Comparative Example 3

POLYMERIZATION PROCESS TO MAKE LOW DENSITY POLYETHYLENE

FIELD OF THE INVENTION

This invention relates to ethylene-based polymers, particularly low density polyethylene (LDPE), and polymerization improvements to make LDPE. Notably, the polymerization process involves autoclave reactor(s), preferably operated sequentially with a tubular reactor(s).

BACKGROUND OF THE INVENTION

There are many types of polyethylene made and sold today. One type in particular is made by various suppliers and sold in large quantities. This polyethylene is called high pressure free radical polyethylene (usually called LDPE) and is usually made using a tubular reactor or an autoclave reactor or sometimes a combination. Sometimes polymer users blend LDPE with other polymers such as linear low density polyethylene (LLDPE) to try to modify properties such as flowability or processability.

We have now discovered new LDPE polymers which have improved extrusion coating properties and can have improved shrinkage in combination with favorable stiffness, tensile strength, melt strength and optics, while maintaining other performance attributes.

For example, S. Goto et al; Journal of Applied Polymer Science: Applied Polymer Symposium, 36, 21-40, 1981 (Ref. No. 1) has the following general discussion regarding reaction kinetics. Low density polyethylene resins with higher densities ($\geq 926$ kg/m$^3$) are produced at reduced polymerization temperature in order to reduce the short chain branching frequency and consequently to increase product density. Both the reaction rate of the short chain branching (also known as backbiting) as well as the long chain branching (also known as transfer with polymer) reaction step are very temperature dependent.

The table below shows the kinetic data on the involved reaction steps (Ref. No. 1). The temperature dependence is given by the activation energy. The higher the activation energy the more a certain reaction step will be promoted by higher temperature or reduced by lower temperatures.

| Rate Constants of Elementary Reaction Rates (Ref. No. 1) | | | |
|---|---|---|---|
| Reaction step | Frequency factor | Activation energy, cal/mole | Activation volume, cm$^3$/mole |
| Propagation | 5.63E+11 | 10,520 | −19.7 |
| LCB | 1.75E+12 | 14,080 | 4.4 |
| SCB | 5.63E+12 | 13,030 | −23.5 |

For polymer properties the ratio between the rate of a certain reaction step and the propagation rate is of importance.

The property temperature dependence is expressed by the Δ Activation energy, so for:
SCB frequency in product: Δ Activation energy=13.03−10.52=2.51 kcal/mole
LCB frequency in product: Δ Activation energy=14.08−10.52=3.57 kcal/mole Above data imply that the LCB frequency decreases faster than the SCB frequency with decreasing temperature. Further the lower maximum polymerization temperatures needed to lower the SCB frequency will also lower the polymer concentration (/profile) in the reactor. Since the LCB reaction rate also depends on polymer concentration, the LCB frequency will be lowered furthermore when increasing polymer density. This means that the LCB frequency is both lowered by the lower polymerization temperature as well as by the lower polymer concentration in the reactor when increasing density of LDPE.

The molecular weight distribution of polyethylene is heavily affected by LCB frequency. High LCB frequency leads to broad MWD resins, while low LCB frequency leads to narrow MWD resins. This means that it becomes increasingly difficult and at some point impossible to produce broad MWD polyethylene resins when increasing polymer density. Broad MWD polyethylene is needed for a variety of extrusion applications, specifically to control the rheology in the molten state. An example is the need for low neck-in during extrusion coating.

SUMMARY OF THE INVENTION

The invention provides a high pressure polymerization process to form an ethylene-based polymer, the process comprising the steps of:
A. Injecting a first feed comprising ethylene and optionally comprising a chain transfer agent system (CTA system) into a first autoclave reactor zone operating at polymerization conditions to produce a first zone reaction product, the transfer activity of the first feed being Z1; and
B. (1) Transferring at least part of the first zone reaction product to a second reactor zone selected from a second autoclave reactor zone or a tubular reactor zone and operating at polymerization conditions, and, optionally, (2) freshly injecting a second feed into the second reactor zone to produce a second zone reaction product, with the proviso that the second reactor zone contains a CTA system having a transfer activity Z2; and
with the proviso that the ratio of Z1/Z2 is less than 1.

In one embodiment the invention is an ethylene-based polymer prepared by the inventive process. In one embodiment the invention is an ethylene-based polymer having a density from 0.926 to 0.935 g/cm$^3$, and a melt index greater than (>) 3 g/10 min, and a melt elasticity, in centiNewtons, greater than or equal to $(8.1 \times (\text{melt index})^{-0.98})$. In one embodiment the invention is a composition comprising the inventive ethylene-based polymer. In one embodiment the invention is an article, e.g., a film, comprising the inventive composition.

DESCRIPTION OF EMBODIMENTS OF THE INVENTION

Overview

Figure 1:
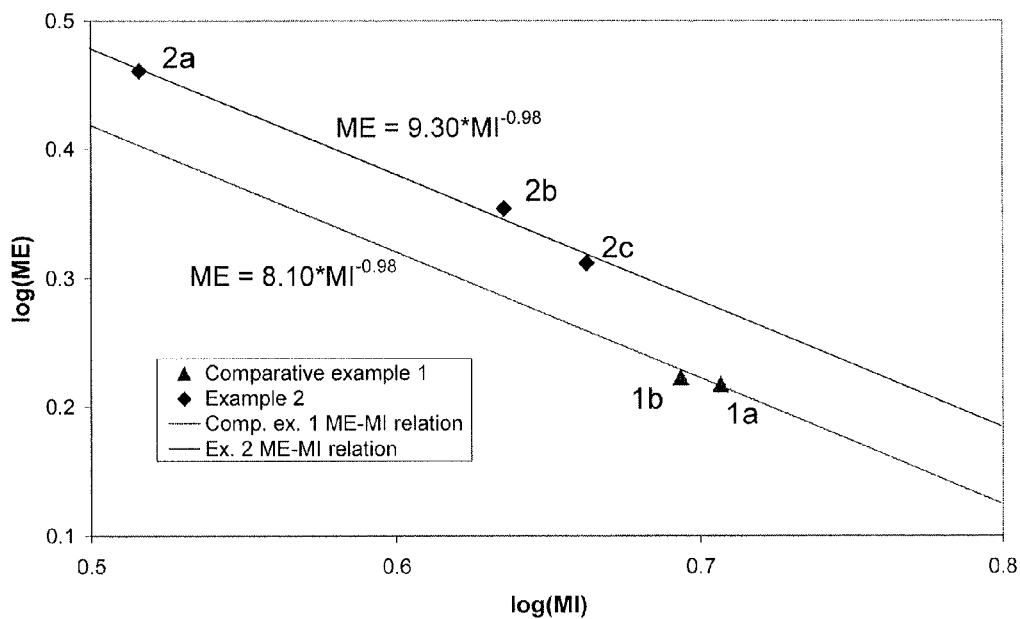
FIG. 1 is a plot of log melt elasticity (ME) versus log melt index (MI) for Comparative Example 1 and Example 2.

As discussed above the invention provides a high pressure polymerization process to form an ethylene-based polymer, the process comprising the steps of:

A. Injecting a first feed comprising ethylene and optionally a chain transfer agent system (CTA system) into a first autoclave reactor zone operating at polymerization conditions to produce a first zone reaction product, the CTA system of the having a transfer activity Z1; and B. (1) Transferring at least part of the first zone reaction product to a second reactor zone selected from a second autoclave reactor zone or a tubular reactor zone and operating at polymerization conditions, and, optionally, (2) freshly injecting a second feed into the second reactor zone to produce a second zone reaction product, with the proviso that the second reactor zone contains a CTA system having a transfer activity Z2; and with the proviso that the ratio of Z1/Z2 is less than 1.

In one embodiment, the process further comprises one or more steps of transferring a zone reaction product produced in an (ith−1) reaction zone to an (ith) reaction zone, where $3 \leq i \leq n$, and $n \geq 3$, each zone operating at polymerization conditions, and optionally adding an (ith) feed comprising a CTA system into the (ith) reaction zone, the CTA system of the (ith) reaction zone having a transfer activity of Zi; and with the proviso that the ratio of $Z1/Zi \leq 1$ for all $i < n$ and $Z1 < Zn$.

In one embodiment, the process in step A the first feed comprises a CTA system have a transfer activity of Z1.

In one embodiment, the process in step B in which the first reactor zone product and/or the freshly injected feed comprises a CTA system resulting in the CTA system of the second reactor zone having a transfer activity Z2.

In one embodiment, a second feed is injected into the second reactor zone, and the second feed comprises ethylene.

In one embodiment, a second feed of the preceding embodiment further comprises a CTA system.

In one embodiment, the second feed is injected into the second reactor zone, and the second feed comprises ethylene but does not comprise a CTA system.

In one embodiment, the first feed of any of the preceding embodiments comprises at least one comonomer.

In one embodiment, the second feed of any of the preceding embodiments comprises at least one comonomer.

In one embodiment, the ith feed of any of the preceding embodiments further comprises ethylene.

In one embodiment, the ith feed of any of the preceding claims further comprises at least one comonomer.

In one embodiment, the at least one comonomer of any of the preceding embodiments is injected into one or more of (i) a suction to a hyper compressor, (ii) a hyper compressor discharge, and (iii) one or more autoclave or tubular reactor zones.

In one embodiment, the at least one comonomer of any of the preceding embodiments is acrylate, silane, vinyl ester, unsaturated carboxylic acid, and carbon monoxide.

In one embodiment of the process of any of the preceding embodiments, steps (B)(1) and (B)(2) are conducted simultaneously.

In one embodiment of the process of any of the preceding embodiments, steps (B)(1) and (B)(2) are conducted at different times.

In one embodiment of the process of any of the preceding embodiments, at least part of the first zone reaction product is transferred to a second autoclave reactor zone.

In one embodiment of the process of any of the preceding embodiments, the second autoclave reactor zone is adjacent to the first autoclave reactor zone.

In one embodiment of the process of any of the preceding embodiments, the second autoclave reactor zone is separated from the first autoclave reactor zone by one or more reactor zones.

In one embodiment of the process of any of the preceding embodiments, at least part of the first zone reaction product is transferred to a tubular reactor zone.

In one embodiment of the process of any of the preceding embodiments, the tubular reactor zone is adjacent to the first autoclave reactor zone.

In one embodiment of the process of any of the preceding embodiments, the tubular reactor zone is separated from the first autoclave reactor zone by one or more reactor zones.

In one embodiment of the process of any of the preceding embodiments, each feed to each reactor zone contains the same CTA system. In a further embodiment the CTA system of each feed contains a single CTA.

In one embodiment of the process of any of the preceding embodiments, at least one of the feeds to at least one of the reactor zones contains a CIA that is different from at least one of the CFAs to the other reactor zones.

In one embodiment of the process of any of the preceding embodiments, each CTA is independently one of an olefin, an aldehyde, a ketone, an alcohol, a saturated hydrocarbon, an ether, a thiol, a phosphine, an amino, an amine, an amide, an ester, and an isocyanate.

In one embodiment of the process of any of the preceding embodiments, each CIA is independently methyl ethyl ketone (MEK), propionaldehyde, butene-1, acetone, isopropanol or propylene.

In one embodiment of the process of any of the preceding embodiments, at least one CTA has a chain transfer constant Cs greater than 0.001.

In one embodiment of the process of any of the preceding embodiments, all autoclave zones are located in the same autoclave reactor.

In one embodiment of the process of any of the preceding embodiments, the autoclave zones are located in two or more different autoclave reactors.

In one embodiment of the process of any of the preceding embodiments, the autoclave zones are of about the same size.

In one embodiment of the process of any of the preceding embodiments, two or more of the autoclave zones are of different sizes.

In one embodiment of the process of any of the preceding embodiments, the polymerization conditions in each reactor zone are operated at the same temperature and same pressure.

In one embodiment of the process of any of the preceding embodiments, at least one polymerization condition in at least one reactor zone is different from the other polymerization conditions.

In one embodiment of the process of any of the preceding embodiments, each of the polymerization conditions in the reactor zones, independently, comprises a temperature greater than, or equal to, 100° C., and a pressure greater than, or equal to, 100 MPa.

In one embodiment of the process of any of the preceding embodiments, each of the polymerization conditions in the reactor zones, independently, comprises a temperature less than 400° C., and a pressure less than 500 MPa.

In one embodiment of the process of any of the preceding embodiments, the ratio $Z1/Zi \leq 1$ for all $i < n$ and the ratio $Z1/Zn$ is less than 0.95.

In one embodiment of the process of any of the preceding embodiments, the ratio $Z1/Zi \leq 1$ for all $i < n$ and the ratio $Z1/Zn$ is less than 0.90.

In one embodiment of the process of any of the preceding embodiments, the ratio $Z1/Zi \leq 1$ for all $i<n$ and the ratio $Z1/Zn$ is greater than or equal to 0.

In one embodiment of the process of any of the preceding embodiments, the ratio $Z1/Zi \leq 1$ for all $i<n$ and the ratio $Z1/Zn$ is greater than 0.

In one embodiment, the invention is a process in which the second feed is injected into the second reaction zone, and the second feed comprises a CTA system.

In one embodiment, the invention is a process in which the second feed is injected into the second reaction zone, and the second feed does not comprises a CTA system.

In one embodiment an inventive process may comprise a combination of two or more embodiments as described herein.

In one embodiment the invention is an ethylene-based polymer made by the process of the any of the preceding embodiments.

In one embodiment, the ethylene-based polymer is a polyethylene homopolymer.

In one embodiment, the ethylene-based polymer is an ethylene-based interpolymer.

In one embodiment, the invention is an ethylene-based polymer having a melt elasticity, in centiNewtons, of more than $8.1 \times (\text{melt index})^{-0.98}$.

In one embodiment, the invention is an ethylene-based polymer having a melt elasticity, in centiNewtons, of more than $9.3 \times (\text{melt index})^{-0.98}$.

In one embodiment, the invention is an ethylene-based polymer having a melt index of greater than 3.0 g/10 min.

In one embodiment, the invention is an ethylene-based polymer having a melt elasticity, in centiNewtons, of more than $8.1 \times (\text{melt index})^{-0.98}$ and a melt index of greater than 3.0 g/10 min.

In one embodiment, the invention is an ethylene-based polymer having a density from 0.926 to 0.935 g/cm$^3$.

In one embodiment, the invention is an ethylene-based polymer having a melt elasticity, in centiNewtons, of more than $8.1 \times (\text{melt index})^{-0.98}$ and a density from 0.926 to 0.935 g/cm$^3$.

In one embodiment, the invention is an ethylene-based polymer having a melt elasticity, in centiNewtons, of more than $8.1 \times (\text{melt index})^{-0.98}$), a melt index of greater than 3.0 g/10 min, and a density from 0.926 to 0.935 g/cm$^3$.

In one embodiment, the ethylene-based polymer of any of the preceding polymer embodiments is a polyethylene homopolymer.

In one embodiment, the ethylene-based polymer of any of the preceding polymer embodiments is an ethylene-based interpolymer.

In one embodiment, the ethylene-based polymer of any of the preceding polymer embodiments is an LIRE.

An inventive ethylene-based polymer may comprise a combination of two or more embodiments as described herein.

In one embodiment, the invention is a composition comprising the ethylene-based polymer of any of preceding polymer embodiments.

In one embodiment, the composition further comprises another ethylene-based polymer.

An inventive composition may comprise the combination of two or more embodiments as described herein.

In one embodiment, the invention is an article comprising at least one component formed from a composition of any of the preceding composition embodiments.

An inventive article may comprise the combination of two or more embodiments as described herein.

In one embodiment, the invention is a film comprising at least one layer formed from the composition of any of the preceding composition embodiments.

An inventive film may comprise the combination of two or more embodiments as described herein.

In one embodiment, the invention is a coating comprising at least one component formed from the composition of any of the preceding composition embodiments.

An inventive coating may comprise the combination of two or more embodiments as described herein.

Polymerizations

For a high pressure, free radical initiated polymerization process, two basic types of reactors are known. In the first type, an agitated autoclave vessel having one or more reaction zones is used: the autoclave reactor. In the second type, a jacketed tube is used as reactor, which tube has one or more reaction zones: the tubular reactor. The high pressure process of the present invention to produce polyethylene homo or copolymers having the advantageous properties as found in accordance with the invention, can be carried out in an autoclave reactor having at least 2 reaction zones or in a combination of an autoclave and a tubular reactor.

The temperature in each autoclave and tubular reactor zone of the process is typically from 100 to 400, more typically from 150 to 350 and even more typically from 160 to 320, ° C. "High pressure" as here used means that the pressure in each autoclave and tubular reactor zone of the process is at least 100 MPa, and is typically from 100 to 400, more typically from 120 to 360 and even more typically from 150 to 320, MPa. The high pressure values used in the process of the invention have a direct effect on the amount of chain transfer agent, for example MEK or propionaldehyde, incorporated in the polymer. The higher the reaction pressure is, the more chain transfer agent derived units are incorporated in the product.

In one embodiment of the process of the invention, a combination of an autoclave comprising at least two reaction zones and a conventional tubular reactor having at least one reaction zone is used. In a further embodiment, such a conventional tubular reactor is cooled by an external water jacket and has at least one injection point for initiator and/or monomer. Suitable, but not limiting, reactor lengths can be between 500 and 1500 meters. The autoclave reactor normally has several injection points for initiator and/or monomer. The particular reactor combination used allows conversion rates of above 20 percent, which is significantly higher than the conversion rates obtained for standard autoclave reactors, which allow conversion rates of about 16-18 percent, expressed as ethylene conversion, for the production of low density type of polymers.

Examples of suitable reactor systems are described in U.S. Pat. Nos. 3,913,698 and 6,407,191.

Monomer and Comonomers

The term ethylene copolymer as used in the present description and the claims refers to polymers of ethylene and one or more comonomers. Suitable comonomers to be used in the ethylene polymers of the present invention include, but are not limited to, ethylenically unsaturated monomers and especially $C_{3-20}$ alpha.-olefins, acetylenic compounds, conjugated or nonconjugated dienes, polyenes, unsaturated carboxylic acids, carbon monoxide, vinyl ester, and $C_{2-6}$ alkyl acrylates.

Initiators

The process of the present invention is a free radical polymerization process. The type of free radical initiator to be used in the present process is not critical. Free radical initiators that are generally used for such processes are oxygen, which is usable in tubular reactors in conventional amounts of between 0.0001 and 0.01 weight percent (wt %) drawn to the weight of polymerizable monomer, and organic peroxides. Typical and preferred initiators are the organic peroxides such as peresters, perketals, peroxy ketones and percarbonates, di-tort-butyl peroxide, cumyl perneodecanoate, and tert-amyl perpivalate. Other suitable initiators include azodicarboxylic esters, azodicarboxylic dinitriles and 1,1,2,2-tetramethylethane derivatives. These organic peroxy initiators are used in conventional amounts of between 0.005 and 0.2 wt % drawn to the weight of polymerizable monomers.

Chain Transfer Agents (CTA)

Chain transfer agents or telogens are used to control the melt flow index in a polymerization process. Chain transfer involves the termination of growing polymer chains, thus limiting the ultimate molecular weight of the polymer material. Chain transfer agents are typically hydrogen atom donors that will react with a growing polymer chain and stop the polymerization reaction of the chain. These agents can be of many different types, from saturated hydrocarbons or unsaturated hydrocarbons to aldehydes, ketones or alcohols. By controlling the concentration of the selected chain transfer agent, one can control the length of polymer chains, and, hence, the molecular weight. The melt flow index (MN or $I_2$) of a polymer, which is related to molecular weight, is controlled in the same way.

The chain transfer agents used in the process of this invention include, but are not limited to, aliphatic and olefinic hydrocarbons, such as pentane, hexane, cyclohexane, propene, pentene or hexane; ketones such as acetone, diethyl ketone or diamyl ketone; aldehydes such as formaldehyde or acetaldehyde; and saturated aliphatic alcohols such as methanol, ethanol, propanol or butanol. Preferred chain transfer agents are those with a chain transfer constant (Cs) of at least 0.001 (e.g., propane, isobutane), more preferably at least 0.01 (e.g., propylene, isopropanol, acetone, 1-butene), and even more preferably at least 0.05 (e.g., methyl ethyl ketone (MEK), propionaldehyde, tert-butanethiol). The Cs is calculated as described by Mortimer at 130° C. and 1360 atmospheres (Ref. No. 1-3 under Table A, infra). The top Cs value typically does not exceed 25, more typically it does not exceed 21.

In one embodiment, the amount of chain transfer agent used in the process of the present invention is from 0.03 to 10.0 percent by weight, preferably from 0.1 to 2.0 percent by weight based on the amount of monomer introduced in the reactor system.

The manner and timing of the introduction of the CTA into the process of the invention can vary widely as long as the CTA and/or ethylene is freshly injected into at least two reaction zones. Typically the CTA is fed to a down stream ($2^{nd}$ and/or $3^{rd}$ and/or $4^{th}$, etc) reaction zone along with ethylene and/or other reaction components, e.g., comonomers, initiator, additives, etc., and additionally some CTA might be fed to the first reaction zone. The first reaction zone is an autoclave.

In one embodiment, make-up CTA, i.e., CTA replacement for the CTA consumed in the first reactor zone is fed together with fresh ethylene through direct injection and/or along with the injected peroxide solution.

In one embodiment, additional (fresh) ethylene without CTA is fed as a make up flow for ethylene consumed in the first reaction zone either to the first autoclave reaction zone and/or to one or more down stream reaction zones.

In one embodiment, the make-up CTA is a CTA with a Cs higher than the Cs of the CTA fed to the first reaction zone. This can increase the conversion level in reactor system.

In one embodiment, the CTA comprises a monomeric group, like propylene, butene-1, etc. The monomeric group enhances reactor conversion (it increases the consumption of the CTA).

In one embodiment, the CTA and/or operating conditions in the recycle sections are selected such that the CTA will condense and/or separate from the recycle ethylene resulting in less CTA recycled back to the reactor inlet.

In one embodiment, CTA is purged from the reactor system in a downstream process section.

In one embodiment, the reactor system comprises two autoclave reaction zones followed by two reaction tubular zones, and ethylene monomer and CTA are fed to both autoclave reaction zones but not to either tubular reaction zone.

In one embodiment, the reactor system comprises two autoclave reaction zones followed by two reaction tubular zones, and ethylene monomer and CTA are fed to both autoclave reaction zones but not to either tubular reaction zone, but initiator is fed to one or both tubular reaction zones.

Polymers

Broad MWD polyethylene is needed for a variety of extrusion applications, specifically to control the rheology in the molten state. An example is the need for low neck-in during extrusion coating.

In one aspect the polymer of this invention has a broader MWD than other polymers made in similar reactors that do not use the split CTA concept (Z1/Zi=1). This is exemplified and quantified with the melt elasticity melt index balance, which is a sensitive method to show these differences as shown by the examples and comparative examples. It is also exemplified by the improvement in extrusion coating performance.

In one embodiment, the ethylene-based polymers of this invention have a typical density from 0.910 to 0.940, more typically from 0.915 to 0.940 and even more typically from 0.926 to 0.935, grams per cubic centimeter (g/cc or g/cm$^3$). In one embodiment, the ethylene-based polymers of this invention have a typical melt index ($I_2$) from 0.1 to 100, more typically from 0.5 to 50 and even more typically from 3.0 to 20, grams per 10 minutes (g/10 min) at 190° C./2.16 kg. In one embodiment, the ethylene-based polymers of this invention have a melt elasticity from 1 to 30, typically from 1.5-15, centiNewtons (cN). In one embodiment, the ethylene-based polymers of this invention have two or more of these density, melt index and melt elasticity properties.

Ethylene-based polymers include LDPE homopolymer (preferred), and high pressure copolymers include ethylene/vinyl acetate (EVA), ethylene ethyl acrylate (EEA), ethylene acrylic acid (EAA) (<0.926 g/cm$^3$) LDPE.

Blends

The inventive polymers can be blended with one or more other polymers such as, but not limited to, linear and ethylene butyl acrylate (EBA). Product applications include collation shrink film, label film, blown and cast film, blow molding, foam, compounding/master batch and injection molding applications etc. for both medium density (≥0.926 g/cm$^3$) and standard density low density polyethylene (LLDPE), copolymers of ethylene with one or more alpha-olefins such as, but not limited to, propylene, butene-1, pentene-1,4-methylpentene-1, pentene-1, hexene-1 and octene-1; high density polyethylene (HDPE) such as HDPE grades HD 940-970 available from The Dow Chemical Company. The amount of inventive polymer in the blend can vary widely, but typically it is from 10 to 90, from 10 to 50, or from 10 to 30, wt %, based on the weight of the polymers in the blend. If the inventive polymer has a relatively narrow MWD (e.g., below 6) then the inventive polymer typically constitutes a majority of the blend, i.e., it is LDPE-rich, and contains 50 or more wt % of the inventive polymer, based on the weight of the polymers in the blend. If the inventive polymer has a relatively broad MWD (e.g., 6 or above), then the inventive polymer typically constitutes a minority of the blend, i.e., it is LDPE-poor, and contains less than 50 wt % of the inventive polymer, based on the weight of the polymers in the blend. LDPE-rich blends typically provide good optics, and/or are useful in the preparation of laminations. LDPE-poor blends typically exhibit good processability, and/or are useful in such applications as film blowing and extrusion coating.

Additives

One or more additives may be added to a composition comprising an inventive polymer. Suitable additives include stabilizers, fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, oil extenders, including paraffinic or napthelenic oils. In addition, other natural and synthetic polymers, including other polymers that are made according to the inventive process, and polymers made by other processes, may be added to an inventive composition.

Uses

The polymer of this invention may be employed in a variety of conventional thermoplastic fabrication processes to produce useful articles, including objects comprising at least one film layer, such as a monolayer film, or at least one layer in a multilayer film prepared by cast, blown, calendered, or extrusion coating processes; molded articles, such as blow molded, injection molded, or rotomolded articles; extrusions; fibers; foams; and woven or non-woven fabrics. Thermoplastic compositions comprising the ethylenic polymer include blends with other natural or synthetic materials, polymers, additives, reinforcing agents, ignition resistant additives, antioxidants, stabilizers, colorants, extenders, crosslinkers, blowing agents, and plasticizers.

The inventive polymer may be used in producing fibers for other applications. Fibers that may be prepared from the polymer of this invention, or a blend comprising a polymer of this invention, include staple fibers, tow, multi-component, sheath/core, twisted, and monofilament. Suitable fiber forming processes include spin-bonded, melt blown techniques, as disclosed in U.S. Pat. No. 4,340,563 (Appel, et al.), U.S. Pat. No. 4,663,220 (Wisneski, et al.), U.S. Pat. No. 4,668,566 (Nohr, et al.), and U.S. Pat. No. 4,322,027 (Reba), gel-spun fibers as disclosed in U.S. Pat. No. 4,413,110 (Kavesh, et al.), woven and nonwoven fabrics, as disclosed in U.S. Pat. No. 3,485,706 (May), or structures made from such fibers, including blends with other fibers, such as polyester, nylon or cotton, thermoformed articles, extruded shapes, including profile extrusions and co-extrusions, calendared articles, and drawn, twisted, or crimped yarns or fibers.

The inventive polymer may be used in a variety of films, including but not limited to, extrusion coating films coated to various substrates, clarity shrink films, collation shrink films, cast stretch films, silage films, stretch hood, sealants, and diaper backsheets. The inventive polymer is also useful in other direct end-use applications. The inventive polymer is useful for wire and cable coating operations, in sheet extrusion for vacuum forming operations, and forming molded articles, including the use of injection molding, blow molding process, or rotomolding processes. Compositions comprising the inventive polymer can also be formed into fabricated articles using conventional polyolefin processing techniques.

Other suitable applications for the inventive polymer include elastic films and fibers; soft touch goods, such as tooth brush handles and appliance handles; gaskets and profiles; adhesives (including hot melt adhesives and pressure sensitive adhesives); footwear (including shoe soles and shoe liners); auto interior parts and profiles; foam goods (both open and closed cell); impact modifiers for other thermoplastic polymers such as high density polyethylene, isotactic polypropylene, or other olefin polymers; coated fabrics; hoses; tubing; weather stripping; cap liners; flooring; and viscosity index modifiers, also known as pour point modifiers, for lubricants.

Further treatment of the polymer of this invention may be performed for application to other end uses. For example, dispersions (both aqueous and non-aqueous) can also be formed using the present polymers or formulations comprising the same. Frothed foams comprising the inventive polymer can also be formed, as disclosed in PCT Publication No. 2005/021622 (Strandeburg, et al.). The inventive polymer may also be crosslinked by any known means, such as the use of peroxide, electron beam, silane, azide, or other crosslinking technique. The inventive polymer can also be chemically modified, such as by grafting (for example by use of maleic anhydride (MAH), silanes, or other grafting agent), halogenation, amination, sulfonation, or other chemical modification.

Definitions

Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of definitions (to the extent not inconsistent with any definitions specifically provided in this disclosure) and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, viscosity, melt index, etc., is from 100 to 1,000, it is intended that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, density, melt index, molecular weight, reagent amounts and process conditions.

The term "composition," as here used means a combination of two or more materials. With the respective to the inventive polymer, a composition is the inventive polymer in combination with at least one other material, e.g., an additive, filler, another polymer, catalyst, etc.

The terms "blend" or "polymer blend," as used, mean an intimate physical mixture (that is, without reaction) of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined infra.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" or "ethylene polymer" refers to a polymer that comprises a majority amount of polymerized ethylene based on the weight of the polymer and, optionally, may comprise at least one comonomer.

The term "ethylene-based interpolymer" or "ethylene interpolymer" refers to an interpolymer that comprises a majority amount of polymerized ethylene based on the weight of the interpolymer, and comprises at least one comonomer.

The term "reactor zone," refers to a section of a reactor where a free radical polymerization reaction takes place by injecting an initiator system, which is able to decompose to radicals at the conditions within the zone. A reactor zone can be a separate reactor unit or a part of a larger reactor unit. In a tubular plug flow reactor unit, each zone begins where fresh initiator is injected. In an autoclave reactor unit, zones are formed by a separation device, e.g., a baffle, preventing back mixing. Each reactor zone has its own initiator feed, while feeds of ethylene, comonomer, chain transfer agent and other components can be transferred from a previous reaction zone, and/or freshly injected (mixed or as separate components).

The term "zone reaction product" refers to the ethylene-based polymer made under high-pressure conditions (e.g., a reaction pressure greater than 100 MPa) through a free radical polymerization mechanism. Due to intermolecular hydrogen transfer, existing dead polymer molecules can be reinitiated, resulting in the formation of long chain branches (LCB) on the original (linear) polymer backbone. In a reactor zone, new polymer molecules are initiated, and a part of the polymer molecules formed will be grafted on existing polymer molecules to form long chain branches. Zone reaction product is defined as the polymer present in the end of the reactor zone.

The term "polymerization conditions" refers to process parameters under which the initiator entering the reactor zone will at least partly decompose into radicals, initiating the polymerization. Polymerization conditions include, for example, pressure, temperature, concentrations of reagents and polymer, residence time and distribution, influencing the molecular weight distribution and polymer structure. The influence of polymerization conditions on the polymer product is well described and modeled in S. Goto et al, Ref No. 1.

The term "CTA system" includes a single CTA or a mixture of CTAs. A CTA system includes a component able to transfer a hydrogen atom to a growing polymer molecule containing a radical by which the radical is transferred to the CTA molecule, which can then initiate the start of a new polymer chain. CTA is also known as telogen or telomer. In a preferred embodiment of the invention, each CTA system comprises a single CTA.

The term "suction to a hyper compressor" refers to the final compressor prior to the reactor that brings one or more feed flows to reactor pressure from a lower pressure. The suction to a hyper compressor is the inlet configuration of this compressor.

The term "hyper compressor discharge" refers to the outlet configuration of the hyper compressor.

The terms "comprising", "including", "having" and the like are not intended to exclude the presence of any additional component, step or procedure, whether or not the same is specifically disclosed. In order to avoid any doubt, all processes claimed through use of the term "comprising" may include one or more additional steps, pieces of equipment or component parts, and/or materials unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

The term "containing" is not intended to exclude the presence of any additional component, step or procedure, whether or not the same is specifically disclosed In the context of a reaction zone containing a CTA system, the term "containing" is not intended to exclude the presence of any CTA system not specifically specified.

Test Methods

Polymer Testing Methods

Density:

Samples for density measurement are prepared according to ASTM D1928. Samples are pressed at 190° C. and 30,000 psi for 3 minutes, and then at 21° C. and 207 MPa for 1 minute. Measurements are made within 1 hour of sample pressing using ASTM D792, Method B.

Melt Index:

Melt index, or $I_2$, (grams/10 minutes) is measured in accordance with ASTM D 1238, Condition 190° C./2.16 kg. $I_{10}$ is measured with ASTM D 1238, Condition 190° C./10 kg pan with a mounted tension roller, and a pull roller controlled by stepper motor. The plastomer produces a molten polymer strand that is guided around the tension roller on the balance pan and up an over another pulley before being wound onto the pull roller. Pull roller speed is precisely controlled by computer. Melt elasticity is determined as the force on the tension roller at a specified draw down ratio (haul off speed/die exit speed). The technology is applicable to thermoplastic and/or thermosetting plastics.

Melt Elasticity:

Melt elasticity is measured using a DMELT system. The DMELT system is comprised of a commercial plastometer, a digital balance incorporating a custom weighted sample Samples for density measurement are prepared according to ASTM I) 1928. Samples are pressed at 190° C. and 30,000 psi for 3 minutes, and then at (21° C.) and 207 MPa for 1 minute. Measurements are made within one hour of sample pressing using ASTM D792 Method B.

For the melt elasticity measurement a molten polymer strand is extruded from a standard plastometer (*MP600 Extrusion Plastometer (Melt Indexer) System Installation & Operation Manual* (0020011560), Tinius Olsen, 1065 Easton Road, Horsham, Pa. 19044-8009; Ref. No. 13.6) barrel at a constant temperature (190° C.) through a standard ASTM D1238 MFR die (orifice height (8.000±0.025 mm) and diameter (2.0955±0.005 mm)) using a weighted piston. The extrudate is pulled through a series of free spinning rollers onto a roller driven by a stepper motor (*Stepper Motor and Controller Operating Manual*, Oriental Motor USA Corporation, 2570 W. 237$^{th}$ Street, Torrance, Calif. 90505; Ref. No. 13.7) which is ramped over a velocity range during the analysis. The force of the polymer strand pulling up on the balance (*Excellence Plus XP Precision Balance Operating Instructions*, Mettler Toledo, 1900 Polaris Parkway, Columbus, Ohio 43240; Ref. No. 13.8) platform mounted tension roller is recorded by the integrated control computer. From a linear regression of the acquired force data, the final reported value is determined based on a constant velocity ratio (33.2) or strain (Ln [Speed ratio]=3.5) of the polymer strand speed versus the die exit speed. Analysis results are reported in units of centiNewtons (cN).

Triple Detector Gel Permeation Chromatography (TDGPC):

High temperature 3Det-GPC analysis is performed on an Alliance GPCV2000 instrument (Waters Corp.) set at 145° C. The flow rate for the GPC is 1 mL/min. The injection volume is 218.5 µL. The column set consists of four Mixed-A columns (20-µm particles; 7.5×300 mm; Polymer Laboratories Ltd).

Detection is achieved by using an IR4 detector from Polymer ChAR, equipped with a CH-sensor; a Wyatt Technology Dawn DSP MALS detector (Wyatt Technology Corp., Santa Barbara, Calif., USA), equipped with a 30-mW argon-ion laser operating at λ=488 nm; and a Waters three-capillary viscosity detector. The MALS detector is calibrated by measuring the scattering intensity of the TCB solvent. Normalization of the photodiodes is done by injecting SRM 1483, a high density polyethylene with weight-average molecular weight (Mw) of 32,100 and polydispersity of 1.11. A specific refractive index increment (dn/dc) of −0.104 mL/mg, for polyethylene in TCB, is used.

The conventional GPC calibration is done with 20 narrow PS standards (Polymer Laboratories Ltd.) with molecular weights in the range 580-7,500,000 g/mol. The polystyrene standard peak molecular weights are converted to polyethylene molecular weights using $$M_{polyethylene} = A \times (M_{polystyrene})^B$$

with A≈0.39, B=1. The value of A is determined by using HDPE Dow 53494-38-4, a linear polyethylene homopolymer with Mw of 115,000 g/mol. The HDPE reference material is also used to calibrate the IR detector and viscometer by assuming 100% mass recovery and an intrinsic viscosity of 1.873 dL/g.

Distilled "Baker Analyzed"-grade 1,2,4-trichlorobenzene (J. T. Baker, Deventer, The Netherlands), containing 200 ppm of 2,6-di-tert-butyl-4-methylphenol (Merck, Hohenbrunn, Germany), is used as the solvent for sample preparation, as well as for the 3Det-GPC experiments. HDPE SRM 1483 is obtained from the U.S. National Institute of Standards and Technology (Gaithersburg, Md., USA).

LDPE solutions are prepared by dissolving the samples under gentle stirring for three hours at 160° C. The PS standards are dissolved under the same conditions for 30 minutes. The sample concentration for the 3Det-GPC experiments is 1.5 mg/mL and the polystyrene concentrations 0.2 mg/mL.

A MALS detector measures the scattered signal from polymers or particles in a sample under different scattering angles θ. The basic light scattering equation (from M. Andersson, B. Wittgren, K.-G. Wahlund, Anal. Chem. 75, 4279 (2003)) can be written as $$\sqrt{\frac{Kc}{R_\theta}} = \sqrt{\frac{1}{M} + \frac{16\pi^2}{3\lambda^2}\frac{1}{M}R_g^2 \sin^2\left(\frac{\theta}{2}\right)} \quad (2)$$

where $R_\theta$ is the excess Rayleigh ratio, K is an optical constant, which is, among other things, dependent on the specific refractive index increment (dn/dc), c is the concentration of the solute, M is the molecular weight, $R_g$ is the radius of gyration, and π is the wavelength of the incident light. Calculation of the molecular weight and radius of gyration from the light scattering data require extrapolation to zero angle (see also P. J. Wyatt, Anal. Chim. Acta 272, 1 (1993)). This is done by plotting $(Kc/R_\theta)^{1/2}$ as a function of $\sin^2(\theta/2)$ in the so-called Debye plot. The molecular weight can be calculated from the intercept with the ordinate, and the radius of gyration from initial slope of the curve. The Zimm and Berry methods are used for all data. The second virial coefficient is assumed to be negligible. The intrinsic viscosity numbers are calculated from both the viscosity and concentration detector signals by taking the ratio of the specific viscosity and the concentration at each elution slice.

ASTRA 4.72 (Wyatt Technology Corp.) software is used to collect the signals from the IR detector, the viscometer, and the MALS detector. Data processing is done with in house-written Microsoft EXCEL macros.

The calculated molecular weight, and molecular weight distribution (Mw/Mn), are obtained using a light scattering constant derived from one or more of the polyethylene standards mentioned and a refractive index concentration coefficient, dn/dc, of 0.104. Generally, the mass detector response and the light scattering constant should be determined from a linear standard with a molecular weight in excess of about 50,000 daltons. The viscometer calibration can be accomplished using the methods described by the manufacturer or alternatively by using the published values of suitable linear standards such as Standard Reference Materials (SRM) 1475a, 1482a, 1483, or 1484a. The chromatographic concentrations are assumed low enough to eliminate addressing $2^{nd}$ viral coefficient effects (concentration effects on molecular weight).

Film Testing Conditions

Haze: Samples measured for overall haze are sampled and prepared according to ASTM D 1003. Films were prepared as described in the experimental section below.

45° and 60° Gloss:

45° and 60° gloss are measured by ASTM D-2457. Films were prepared as described in the experimental section below.

EXPERIMENTAL

Calculations for Z1, Z2 and Zi

The "reactor zone molar concentration of a CTA j in a reactor zone i ([CTA]ji)" is defined as the "total molar amount of that CTA freshly injected to reactor zones 1 to i" divided by the "total molar amount of ethylene freshly injected to reactor zones 1 to i." This relationship is shown below in Equation A.

$$[CTA]_{j_i} = \frac{\sum_{k=1}^{i} n_{CTA,j_k}}{\sum_{k=1}^{i} n_{eth_k}} \quad \text{(Eqn. A)}$$

In Equation A, $j \geq 1$, $n_{CTA,j_i}$ is the "amount of moles of the jth CTA freshly injected to the ith reactor zone," and $n_{eth_i}$ is the "amount of moles of ethylene freshly injected to the ith reactor zone."

The "transfer activity of a CTA (system) in a reactor zone i" is defined as the "sum of the reactor zone molar concentration of each CTA in the reactor zone" multiplied with its chain transfer activity constant (Cs). The chain transfer activity constant (Cs) the ratio of reaction rates Ks/Kp, at a reference pressure (1360 atm) and a reference temperature (130° C.). This relationship is shown below in Equation B, where $n_{comp}i$ is the total number of CTAs in reactor zone i.

$$Z_i = \sum_{j_i=1}^{n_{comp,i}} [CTA]_{j_i} \cdot C_{s,j} \quad \text{(Eqn. B)}$$

Thus, the ratio Z1/Zi is shown below in Equation C.

$$\frac{Z_1}{Z_i} = \frac{\sum_{j_1=1}^{n_{comp,1}} [CTA]_{j_1} \cdot C_{s,j}}{\sum_{j_i=1}^{n_{comp,i}} [CTA]_{j_i} \cdot C_{s,j}} \quad \text{(Eqn. C)}$$

The chain transfer constant (Cs) values for some chain transfer agents are shown below in Table A., showing chain transfer constants (Cs) derived by Mortimer at 130° C. and 1360 atm for example chain transfer agents.

TABLE A

Cs-Values as Measured by Mortimer at 130° C. and 1360 atm in References 3 and 4

| CTA | Cs at 130° C. and 1360 atm |
|---|---|
| propane | 0.0030 |
| iso-butane | 0.0072 |
| propylene | 0.0122 |
| iso-propanol | 0.0144 |
| acetone | 0.0168 |
| 1-butene | 0.047 |
| methyl ethyl ketone | 0.060 |
| propionaldehyde | 0.33 |
| tert-butanethiol | 15 |

Ref. No. 2. G. Mortimer; Journal of Polymer Science: Part A-1; Chain transfer in ethylene polymerization; vol 4, p 881-900 (1966)
Ref. No. 3. G. Mortimer; Journal of Polymer Science: Part A-1; Chain transfer in ethylene polymerization. Part Iv. Additional study at 1360 atm and 130° C.; vol 8, p1513-1523 (1970)
Ref. No. 4. G. Mortimer; Journal of Polymer Science: Part A-1; Chain transfer in ethylene polymerization. Part VII. Very reactive and depletable transfer agents; vol 10, p163-168 (1972)

When only one CTA is used in the total reactor system, Equations B and C simplify to Equations D and E, respectively.

$$Z_i = [CTA]_i \cdot C_s \quad \text{(Eqn. D)}$$

$$\frac{Z_1}{Z_i} = \frac{[CTA]_1 \cdot C_s}{[CTA]_i \cdot C_s} = \frac{[CTA]_1}{[CTA]_i} \quad \text{(Eqn. E)}$$

Four reactor zones are used configured as A A T T. Reactor zone 1 is A, reactor zone 2 is A, reactor zone 3 is T, reactor zone 4 is T. CTA is injected into zones 1 and 2, only initiator is injected into zones 3 and 4, however typically some CTA is carried over into zones 3 and 4 from zones 1 and 2. No CTA is added to reactor zones 3 and 4.

Only one CTA implies that Cs drops out of equations, and thus, Equation E is used for most examples, as shown below.

$$\frac{Z_1}{Z_2} = \frac{[CTA]_1 \cdot C_s}{[CTA]_2 \cdot C_s}$$

$$= \frac{[CTA]_1}{[CTA]_2}$$

$$= \frac{\sum_{k=1}^{1} n_{CTA_k}}{\sum_{k=1}^{1} n_{eth_k}} \cdot \frac{\sum_{k=1}^{2} n_{eth_k}}{\sum_{k=1}^{2} n_{CTA_k}}$$

$$= \frac{\sum_{k=1}^{2} n_{eth_k}}{\sum_{k=1}^{1} n_{eth_k}} \cdot \frac{\sum_{k=1}^{1} n_{CTA_k}}{\sum_{k=1}^{2} n_{CTA_k}}$$

$$= \frac{n_{eth_1} + n_{eth_2}}{n_{eth_1}} \cdot \frac{n_{CTA_1}}{n_{CTA_1} + n_{CTA_2}}$$

In addition, the tubular part of the AC/tube reactor system (which is the system used to generate all examples) can be considered as reactor zones 3 and 4, where both zones do not receive any additional freshly injected ethylene or CTA. This means that Equation E becomes as shown below. So Z1/Z4=Z1/Z3=Z1/Z2.

$$\frac{Z_1}{Z_i} = \frac{[CTA]_1 \cdot C_s}{[CTA]_i \cdot C_s}$$

$$= \frac{[CTA]_1}{[CTA]_i}$$

$$= \frac{\sum_{k=1}^{1} n_{CTA_k}}{\sum_{k=1}^{1} n_{eth_k}} \cdot \frac{\sum_{k=1}^{i} n_{eth_k}}{\sum_{k=1}^{i} n_{CTA_k}}$$

$$= \frac{\sum_{k=1}^{i} n_{eth_k}}{\sum_{k=1}^{1} n_{eth_k}} \cdot \frac{\sum_{k=1}^{1} n_{CTA_k}}{\sum_{k=1}^{i} n_{CTA_k}}$$

-continued $$= \frac{\sum_{k=1}^{2} n_{eth_k}}{\sum_{k=1}^{1} n_{eth_k}} \cdot \frac{\sum_{k=1}^{1} n_{CTA_k}}{\sum_{k=1}^{2} n_{CTA_k}}$$

$$= \frac{Z_1}{Z_2}, i \geq 3$$

In addition, for all examples: $n_{eth_1} = n_{eth_2}$, and thus, the relationship is further simplified as shown below.

$$\frac{Z_1}{Z_2} = \frac{n_{eth_1} + n_{eth_2}}{n_{eth_1}} \cdot \frac{n_{CTA_1}}{n_{CTA_1} + n_{CTA_2}} =$$

$$\frac{n_{eth_1} + n_{eth_1}}{n_{eth_1}} \cdot \frac{n_{CTA_1}}{n_{CTA_1} + n_{CTA_2}} = 2 \cdot \frac{n_{CTA_1}}{n_{CTA_1} + n_{CTA_2}}$$

Polymerization and Polymers

Comparative Example 1

Make-Up MEK (CTA) is Equally Divided Over Both Autoclave Reaction Zones (1 and 2)

Reactor pressure: 2450 bar

Autoclave (AC) residence time: 55 seconds

Tubular residence time: 80 seconds

Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.

Temperature Conditions:

Autoclave top-zone (50% ethylene): Inlet: 37° C.; control 185° C.

Autoclave bottom-zone (50% ethylene): Inlet: 35° C.; control 185° C.

Tube $1^{st}$ zone control: 274° C.

Tube $2^{nd}$ zone control: 274° C.

Methyl ethyl ketone (MEK) is used as the chain transfer agent. The recycled MEK (after partial conversion in the reactor, partial condensation in the low pressure recycle section and/or partial purging) is equally divided over both reactor ethylene feed streams and both AC reaction zones. The fresh make-up MEK (to maintain MEK concentration in order to control/vary MI) is equally divided over both AC reaction zones.

Product Sampling

Samples are taken to measure the rheology results of the polymer, and one sample (1b) is taken for extrusion coating and blown film evaluation. Results are reported in Table 1.

TABLE 1

Comparative Example 1a-1d Rheology Results and MEK Concentrations

| Sample | Melt-index dg/min | Melt-elasticity cN | MEK (AC) feed Zone 1 Molar ppm | MEK (AC) feed Zone 2 Molar ppm | Z1/Z2 | Z1/Zn |
|---|---|---|---|---|---|---|
| 1a | 5.09 | 1.65 | 4610 | 4610 | 1.00 | 1.00 |
| 1b | 4.94 | 1.67 | 4852 | 4852 | 1.00 | 1.00 |

Inventive Example 2

Make-Up MEK (CTA) is Sent to the Autoclave Bottom Reaction Zone

Reactor pressure: 2450 bar

Autoclave residence time: 55 seconds

Tubular residence time: 80 seconds

Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.

Temperature Conditions:

Autoclave top-zone (50% fresh ethylene): Inlet: 37° C.; control 185° C.

Autoclave bottom-zone (50% fresh ethylene): Inlet: 35° C.; control 185° C.

Tube $1^{st}$ zone control: 274° C.

Tube $2^{nd}$ zone control: 274° C.

Methyl ethyl ketone (MEK) is used as chain transfer agent. The recycled MEK (after partial conversion in the reactor, partial condensation in the low pressure recycle section and or partial purging) is equally divided over both reactor ethylene feed streams and both AC reaction zones. The fresh make-up MEK (to maintain MEK concentration in order to control MI) is fed into the ethylene feed stream sent to the Autoclave bottom zone.

Product Sampling

Samples are taken to measure the rheology response of the polymer, and one sample (2c) is taken for extrusion coating and blown film evaluation. Results are reported in Table 2.

TABLE 2

Example 2 Rheology Results and MEK Concentrations

| Sample | Melt-index dg/min | Melt-elasticity cN | MEK AC feed Zone 1 Molar ppm | MEK AC feed Zone 2 Molar ppm | Z1/Z2 | Z1/Zn |
|---|---|---|---|---|---|---|
| 2a | 3.28 | 2.89 | 3919 | 5783 | 0.81 | 0.81 |
| 2b | 4.32 | 2.26 | 4124 | 6116 | 0.81 | 0.81 |
| 2c | 4.60 | 2.05 | 4122 | 6082 | 0.81 | 0.81 |

Comparative Example 3

Make-Up Propylene (CIA) is Equally Divided Over Both Autoclave Reaction Zones (1 and 2)

Reactor pressure: 2000 bar
Autoclave (AC) residence time: 55 seconds
Tubular residence time: 80 seconds
Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.
Temperature Conditions:
Autoclave top-zone (50% fresh ethylene): Inlet: 40° C.; control 202° C.
Autoclave bottom-zone (50% fresh ethylene): Inlet: 36° C.; control 236° C.
Tube $1^{st}$ zone control: 275° C.
Tube $2^{nd}$ zone control: 275° C.
Propylene is used as the chain transfer agent. The recycled propylene (after partial conversion in the reactor, partial condensation in the low pressure recycle section and/or partial purging) is equally divided over both reactor make up ethylene feed streams and both AC reaction zones. The fresh make-up propylene (to maintain propylene concentration in order to control/vary MI) is equally divided over both AC reaction zones.

Product Sampling

Samples are taken to measure the rheology response and the blown film evaluation. Results are reported in Table 3.

TABLE 3

Comparative Example 3 Rheology Results and Propylene Concentrations

| Sample | Melt-index dg/min | Melt-elasticity cN | Propylene AC feed Zone 1 Molar ppm | Propylene AC feed Zone 2 Molar ppm | Z1/Z2 | Z1/Zn |
|---|---|---|---|---|---|---|
| 3 | 1.07 | 13.10 | 16120 | 16120 | 1.00 | 1.00 |

Inventive Example 4

Make-Up Propylene (CTA) is Sent to the Autoclave Bottom Reaction Zone

Reactor pressure: 2000 bar
Autoclave residence time: 55 seconds
Tubular residence time: 80 seconds
Tert-butyl peroxyperpivalate (TBPV) is injected as free radical initiator in each autoclave reactor zone. At the beginning of the two reactor zones of the tubular reactor, a mixture of tert-butyl peroxy-2-ethylhexanoate (TBPO) and di-tert-butyl peroxide (DTBP) is injected as additional free radical initiator.
Temperature Conditions:
Autoclave top-zone (50% fresh ethylene): Inlet: 40° C.; control 204° C.
Autoclave bottom-zone (50% fresh ethylene): Inlet: 36° C.; control 237° C.
Tube $1^{st}$ zone control: 276° C.
Tube $2^{nd}$ zone control: 275° C.
Propylene is used as chain transfer agent. The recycled propylene (after partial conversion in the reactor, partial condensation in the low pressure recycle section and or partial purging) is equally divided over both reactor make up ethylene feed streams and both AC reaction zones. The fresh make-up propylene (to maintain propylene concentration in order to control MI) is fed into the ethylene feed stream sent to the Autoclave bottom zone.

Product Sampling

Samples are taken to measure the rheology response and the blown film evaluation. Results are reported in Table 4.

TABLE 4

Example 4 Rheology Results and Propylene Concentrations

| Sample | Melt-index dg/min | Melt-elasticity cN | Propylene AC feed Zone 1 Molar ppm | Propylene AC feed Zone 2 Molar ppm | Z1/Z2 | Z1/Zn |
|---|---|---|---|---|---|---|
| 4 | 0.97 | 13.65 | 12350 | 16370 | 0.86 | 0.86 |

TABLE 5

Properties of the Example Polymers

| Example No. | Z1/Z2 | density (kg/m³) | Mw/Mn | MI (dg/min) | ME (cN) |
|---|---|---|---|---|---|
| Comp. Ex. 1b | 1.00 | 929 | 5.15 | 4.94 | 1.67 |
| Example 2c | 0.81 | 929 | 5.99 | 4.60 | 2.05 |
| Comp. Ex. 3 | 1.00 | 919 | 9.62 | 1.07 | 13.10 |
| Example 4 | 0.86 | 920 | 10.30 | 0.97 | 13.65 |

Polymers and Films

Each of the films was formed using the process parameters shown in Table 6. Inventive film 1 was made from a sample of the polymer of Example 2c.

Inventive film 2 was made from a sample of the polymer of Example 4.

Comparative film 1 was made from a sample of the polymer of Comparative Example 1.

Comparative film 2 was made from a sample of the polymer of Comparative Example 3.

All of the films are made with a "25/1 chrome-coated screw (compression ratio 3/1; feed zone 10D; transition zone 3D; metering zone 12D)," connecting to a "25 mm diameter die." No internal bubble cooling is used. General blown film parameters used to produce the blown film are shown in Table 8. The same conditions were used for all examples and comparative examples. Barrel 1 of the temperature profile is closest to the pellet hopper followed by Barrel 2, which is followed by Barrel 3, which is followed by Barrel 4. The thickness of the films was measured by micrometer.

TABLE 6

Blown Film Fabrication Conditions

| Parameter | |
|---|---|
| Blow up ratio (BUR) | 2.75 |
| Output (kg/hr) | 1.8 |
| Film Thickness (micron) | 50 ± 1.0 |
| Die Gap (mm) | 0.8 |
| Air Temperature (° C.) | 23 |

TABLE 6-continued

Blown Film Fabrication Conditions

Parameter

Temperature Profile (° C.)

| | |
|---|---|
| Barrel 1 | 150 |
| Barrel 2 | 165 |
| Barrel 3 | 175 |
| Barrel 4 | 175 |
| Die | 175 |

Figure 2:
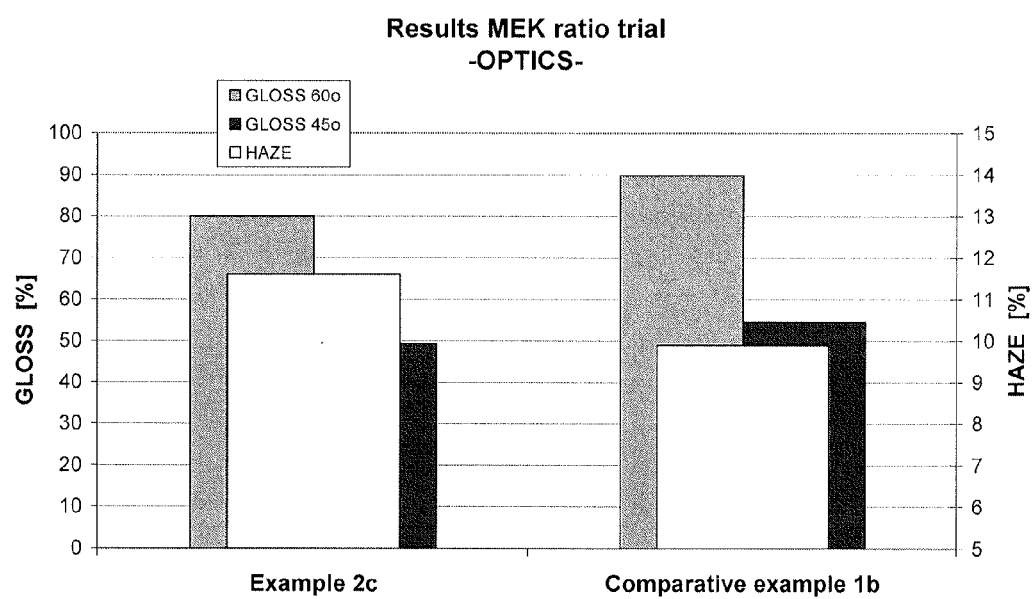
FIG. 2 is a plot of gloss and haze for Example 2c and Comparative Example 1b.
Figure 3:
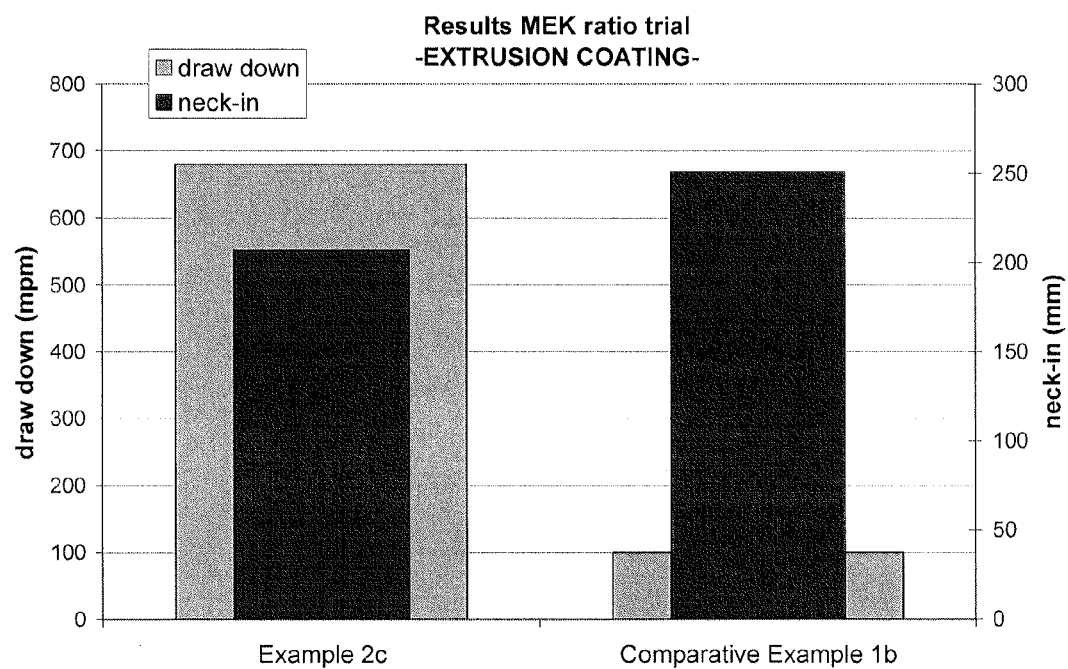
FIG. 3 is a plot of drawdown (meters per minute (mpm) and neck-in millimeters (mm)) for Example 2c and Comparative Example 1b.
Figure 4:
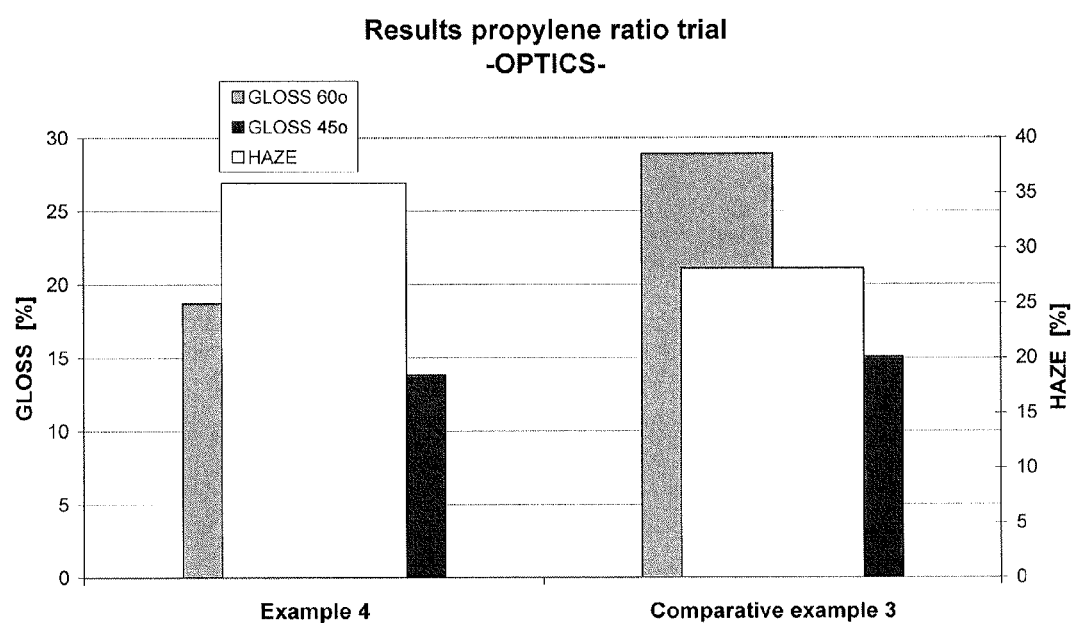
FIG. 4 is a plot of gloss and haze for Example 4 and Comparative Example 3.

The films and their optical properties are shown in Tables 7 and 8 below and in FIGS. 2-3, respectively. All averages and standard deviations are based on ten measurements per sample.

TABLE 7

Optical Properties of Blown Film Samples of Comparative Example 1d and Example 2e

| Example No. | Haze (%) | Gloss 45° (%) |
|---|---|---|
| Comparative Example 1b | 9.9 ± 0.4 | 54.7 ± 1.8 |
| Example 2c | 11.6 ± 0.4 | 49.3 ± 2.4 |

TABLE 8

Optical Properties of Blown Film Samples of Comparative Example 3 and Example 4

| Example No. | Haze (%) | Gloss 45° (%) |
|---|---|---|
| Comparative Example 3 | 28.1 ± 0.7 | 15.1 ± 1.9 |
| Example 4 | 35.9 ± 0.7 | 13.8 ± 1.8 |

Polymers and Extrusion Coating

Extrusion coating was performed on Comparative Example 1b and Example 2c. The melt index of Comparative Example 3 and Example 4 is too low for a good coating operation. Each of the coatings was formed according to the following conditions. The resins were extruded at a set extruder temperature of 320° C. from a coat hanger type extrusion die with a nominal die gap of 0.7 mm, onto 70 g/m$^2$ Kraft paper in an amount of 25 g/m$^2$ in parts with in process addition of 40 micron aluminum sheets, using an air gap of 250 mm and varying line speeds in meters per minute, and at a line speed of 100 m/min, but with varying air gaps, utilizing a matt chill roll maintained at a temperature of 15 to 20° C.

Inventive coating 1 was made from a sample of the polymer of Example 2c.

Comparative coating 1 was made from a sample of the polymer of Comparative Example 1b. Coating results are shown in Table 9 below. Draw down is the maximum line speed attainable during stable coating. Neck-in is the shrinkage in the width of the web in comparison to the die width at fixed line speed (100 m/min). Lower neck-in and higher draw down are both very desirable. Lower neck-in means better dimensional stability of the web which, in turn, provides better control of the coating onto the substrate. Higher draw down means higher line speed which, in turn, means better productivity.

TABLE 9

Extrusion Coating Properties of Samples of Comparative Example 1b and Example 2c

| Example No. | Draw Down (mpm) | Neck-In (mm) |
|---|---|---|
| Comparative Example 1b | 100 | 251 |
| Example 2c | 680 | 207 |

Although the invention has been described with certain detail through the preceding description of the preferred embodiments, this detail is for the primary purpose of illustration. Many variations and modifications can be made by one skilled in the art without departing from the spirit and scope of the invention as described in the following claims.

What is claimed is:

1. An ethylene homopolymer characterized by the following properties: (1) a melt elasticity, in centiNewtons, of more than, or equal to, $(9.3 \times (\text{melt index})^{-0.98})$, a melt index greater than 3 g/10 min, and a density from 0.926 to 0.935 g/cm$^3$.

2. The ethylene homopolymer polymer of claim 1, as a low density polyethylene (LDPE).

3. The ethylene homopolymer of claim 2 in which the melt index does not exceed 3.28 g/10 min.

4. The ethylene homopolymer of claim 2 in which the melt index does not exceed 4.32 g/10 min.

5. The ethylene homopolymer of claim 2 in which the melt index does not exceed 4.60 g/10 min.

6. The ethylene homopolymer of claim 2 in which the melt index is from 3.28 to 4.60 g/10 min.

7. The ethylene homopolymer of claim 2 made by a high pressure polymerization process to form an ethylene-based polymer, the process comprising the steps of:

A. Injecting a first feed comprising ethylene and optionally a chain transfer agent system (CTA system) into a first autoclave reactor zone operating at polymerization conditions to produce a first zone reaction product, the CTA system of the first reactor zone having a transfer activity Z1; and B. (1) Transferring at least part of the first zone reaction product to a second reactor zone selected from a second autoclave reactor zone or a tubular reactor zone and operating at polymerization conditions, and (2) freshly injecting a second feed into the second reactor zone to produce a second zone reaction product, with the proviso that the second reactor zone contains a CTA system having a transfer activity Z2; and (3) with the provisos that (a) the ratio of Z1/Z2 is less than 1, and (b) the freshly injected second feed comprises, fresh ethylene but does not comprise a CTA.

\* \* \* \* \*